United States Patent [19]

Pfaffmann et al.

[11] 3,737,612
[45] June 5, 1973

[54] APPARATUS FOR INDUCTIVELY HEATING VALVE SEATS

[75] Inventors: George D. Pfaffmann, Farmington; Michael R. Hammond, Detroit, both of Mich.

[73] Assignee: Park-Ohio Industries, Inc., Cleveland, Ohio

[22] Filed: June 9, 1971

[21] Appl. No.: 151,494

[52] U.S. Cl. .........219/10.79, 219/10.43, 219/10.57, 266/4 E
[51] Int. Cl. ...............................................H05b 5/04
[58] Field of Search....................219/10.79, 10.43, 219/10.57, 10.69; 266/4 E; 148/146

[56] References Cited

UNITED STATES PATENTS

| 2,268,527 | 12/1941 | Somes | 219/10.57 X |
| 2,757,268 | 7/1956 | Edwards | 219/10.79 X |
| 2,397,629 | 4/1946 | Stevens | 219/10.43 |
| 2,689,296 | 9/1954 | Sabol | 219/10.79 |
| 2,512,893 | 6/1950 | Gehr | 219/10.79 X |
| 3,403,241 | 9/1968 | Kauffman | 219/10.79 X |

Primary Examiner—J. V. Truhe
Assistant Examiner—B. A. Reynolds
Attorney—Meyer, Tilberry and Body

[57] ABSTRACT

An induction heating device for inductively heating the first of a pair of closely positioned conical valve seats in an internal combustion engine block which device comprises an inductor having a generally circular shape matching the first valve seat, means for positioning the inductor adjacent the valve seat and spaced only slightly therefrom, a radio frequency power source having a frequency of over 250 Kc, means including two spaced leads for connecting the power source to the inductor, means for starting the power source, and means for stopping the power source after a preselected time whereby the valve seat is hardened by quenching from conduction to the engine block itself.

3 Claims, 8 Drawing Figures

APPARATUS FOR INDUCTIVELY HEATING VALVE SEATS

This invention relates to the art of induction heating and more particularly to a method and apparatus for inductively heating valve seats of the type found in the engine block of an internal combustion engine.

The invention is particularly applicable for inductively heating the exhaust valve seats of a gray cast iron engine block before quench hardening thereof, and it will be described with particular reference thereto; however, the invention has much broader applications and may be used for inductively heating a variety of conically shaped metal surfaces.

The valve seat for the exhaust valve, especially, in a gray cast iron engine head for internal combustion engines must have an extremely high wear characteristic at high temperatures. This requirement is becoming more pronounced with the advent of reduced lead gasoline because the absence of lead and/or phosphorous within the gasoline increases the amount of wear experienced by the valve seat and valves during operation. Automotive companies have been seeking to solve this problem by better control of the heating operation prior to quench hardening of the valve seat. In the past, circular conductors having generally round cross-sections have been positioned directly adjacent the conical valve seats. An audio frequency generator, such as a motor generator, would then power the inductors to heat inductively conical surfaces of the valve seat. By this method, the position of the inductor was extremely critical to satisfactory results. Also, subsequent quench hardening by a coolant caused the outside surface of the valve seat to cool first. By using this type of installation, there was a relatively deep heating pattern created within the valve seat so that the quenching operation caused uneven heating especially adjacent areas having radically different heat sinks caused by different adjacent masses of the engine head. By creating a relatively deep heating pattern, more mass adjacent the valve seat was heated. This drastically affected the amount of material subjected to thermal expansion caused by increased temperatures. This again resulted in thermal stresses upon cooling and uneven hardening by subsequent quenching. In order to concentrate a sufficient amount of flux from the inductor, the inductor was provided with flux concentrators formed from soft iron. These concentrators often deteriorated during use and thus changed the coupling effect between the inductor and the valve seat surface. By having a circular cross-section, the inductor was extremely sensitive to variations in spacing between the inductor and the valve seat. All of these disadvantages have been overcome by the present invention wherein an improved inductor arrangement is provided and the inductor is powered by a frequency exceeding 250 Kc. and generally in the range of 250 Kc to 500 Kc.

In accordance with the present invention, there is provided a method of hardening the conical valve seat of a ferrous internal combustion engine head. This method comprises placing a generally circular inductor adjacent the valve seat, energizing the inductor with a primary power source having a frequency over 250 Kc and a selected power, maintaining the inductor energized for a given time to transform the metal forming the valve seat into an austenitic structure to a selected depth generally corresponding to the reference depth for the frequency of the power source, then, allowing the valve seat material to quench out by conduction from the valve seat to the engine head itself.

In accordance with another aspect of the present invention there is provided an induction heating device for inductively heating the first of a pair of closely positioned conical valve seats in an internal combustion engine head. This device comprises an inductor having a generally circular shape matching the first valve seat, means for positioning the inductor adjacent the valve seat and spaced only slightly therefrom, a radio frequency power source having a frequency of over 250 Kc, means including two spaced leads for connecting the power source to the inductor, means for starting the power source, and means for stopping the power source after a preselected time whereby the valve seat is inductively heated for subsequent quench hardening to a relatively low depth so that the quenching can be accomplished by conduction to the engine head as opposed to actual quenching.

The primacy object of the present invention is the provision of a method and apparatus of hardening a valve seat of an engine head, which method and apparatus provides a uniform, compressive hardened structure at the valve seat.

Another object of the present invention is the provision of a method and apparatus of hardening a valve seat of an engine head, which method and apparatus allows quenching by conduction to the mass surrounding the valve seat.

Yet another object of the present invention is the provision of a method and apparatus of hardening a valve seat of an engine head, which method and apparatus provide uniform heating irrespective of different mass sinks around the valve seat periphery.

These and other objects and advantages will become apparent from the following description used in connection with the accompanying drawings in which.

Figure 1:
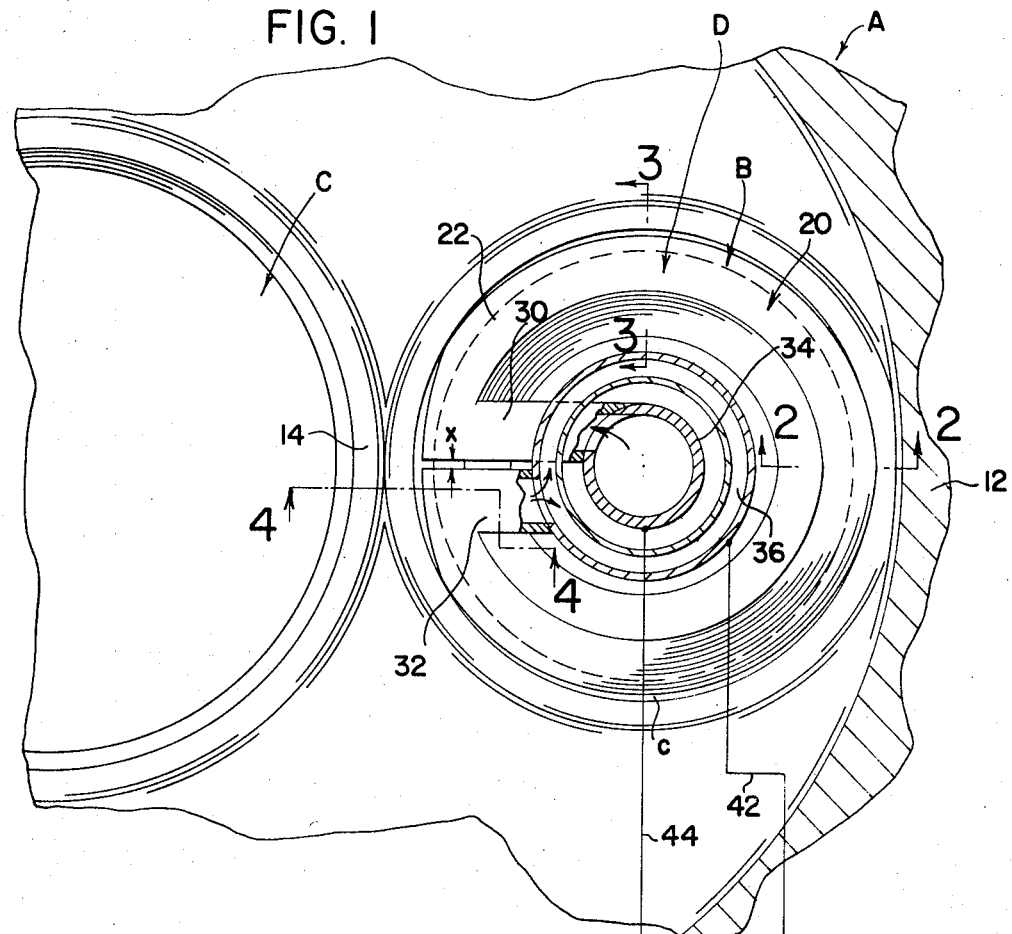
FIG. 1 is a partial top view illustrating, somewhat schematically, the preferred embodiment of the present invention.

Referring now to the drawings wherein the showings are for the purpose of illustrating a preferred embodiment of the invention only, and not for the purpose of limiting same, FIG. 1 shows a somewhat standard engine head A formed from gray cast iron and including an exhaust port B and and a closely spaced intake port C. Each of these ports includes a valve seat; however, in accordance with the present invention only the valve seat of the exhaust port B is hardened by an induction heating device D.

Figure 2:
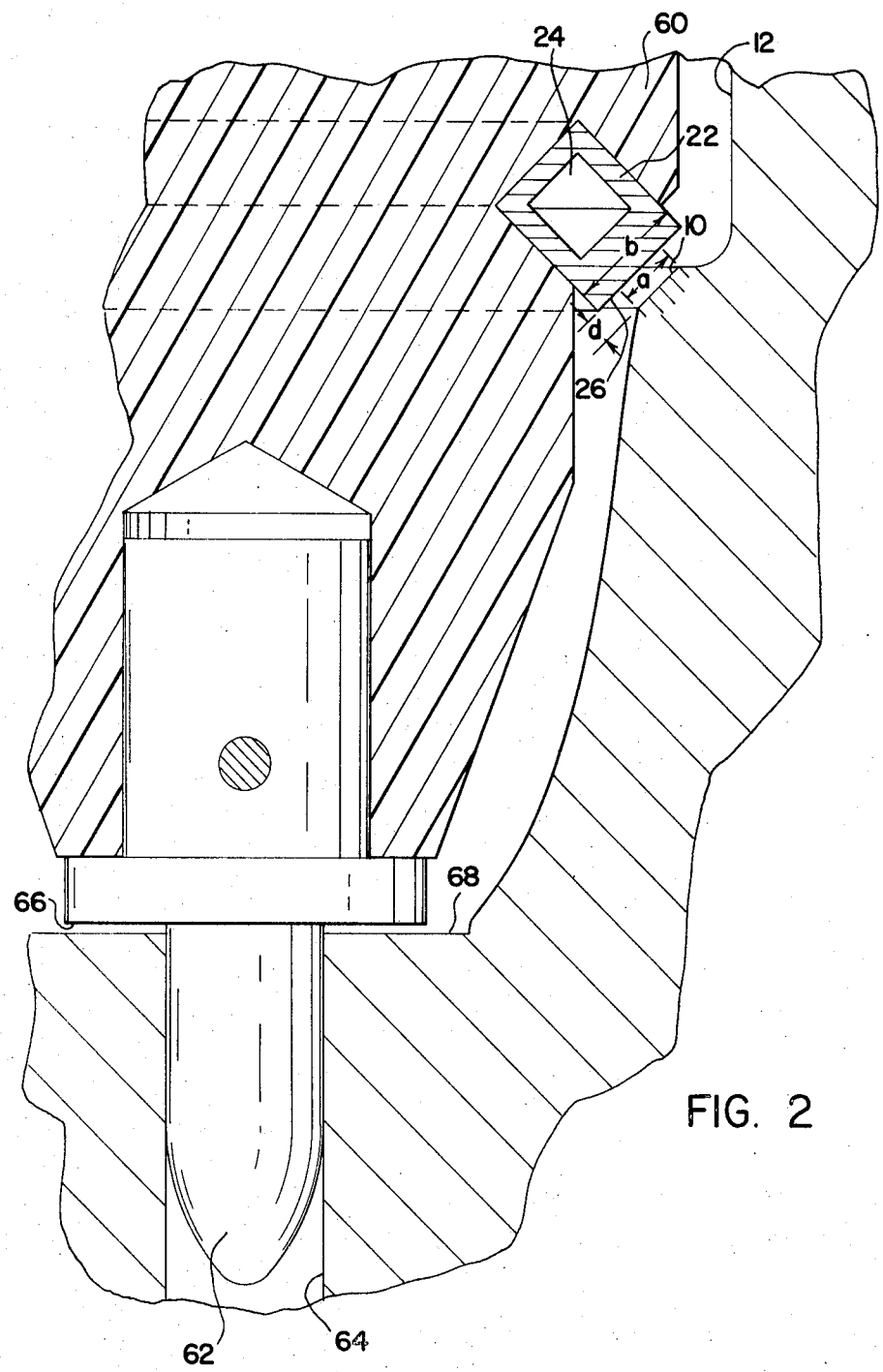
FIG. 2 is a cross-section taken generally along line 2—2 of FIG. 1.
Figure 2A:
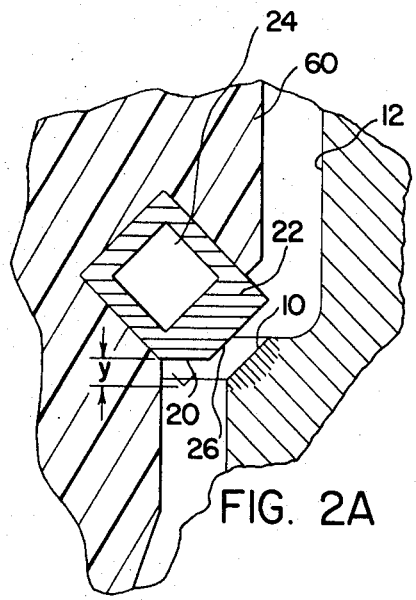
FIG. 2A is a view similar to FIG. 2 showing a modification of the present invention.
Figure 3:
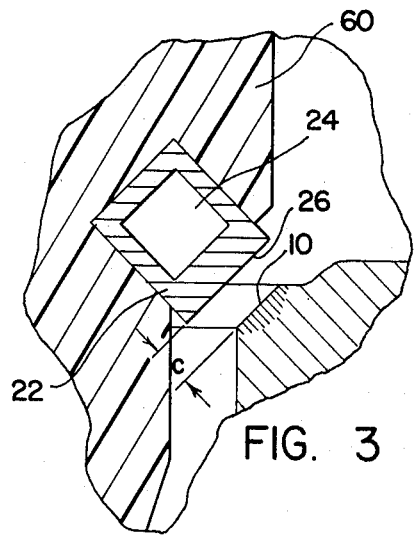
FIG. 3 is a cross-sectional view taken generally along line 3—3 of FIG. 1.
Figure 4:
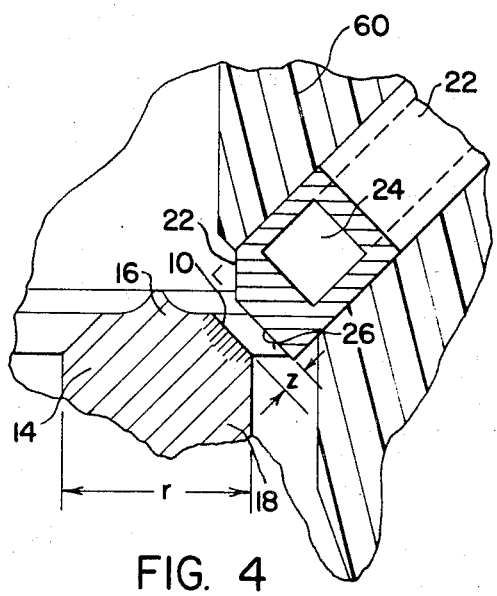
FIG. 4 is a cross-sectional view taken generally along line 4—4 of FIG. 1.

Referring now to the exhaust port B, as shown in FIGS. 2, 2A, 3 and 4, a conical valve seat 10 having a diameter, generally in the range of 1.5–1.8 inches and a width a includes a first portion shown in FIGS. 2, 2A, wherein a heavy mass 12 is above the valve seat, a second portion shown in FIG. 3 wherein the mass around the valve seat is generally uniform at the upper and lower positions, and a third position shown in FIG. 4 which is adjacent the intake port C and a bridge 14 having a thickness r. Consequently, the third portion of the valve seat is adjacent an upper portion 16 of the valve seat which has a substantially lesser mass than a heavier lower portion 18. It is quite apparent that the mass of the block adjacent the valve seat drastically varies throughout the circumference of the valve seat. This causes an inherent non-uniformity in heating and quench hardening if all portions of the valve seat are heated by the same flux field. The present invention contemplates structural features in a novel inductor 20 for overcoming the disadvantages inherent in a conical metal surface having a variety of different masses which form different mass or temperature sinks around the circumference of the conical surface.

Referring now in more detail to the inductor 20, it includes a generally circular conductor 22 having a generally rectangular cross-section and a central coolant passage 24. In accordance with the invention, the flat surface 26 of the conductor 22 is generally parallel to the conical surface of the valve seat 10 and has a width $b$ which is substantially greater than the width $a$ of the valve seat. Consequently, vertical variations caused by tolerances in the engine block do not drastically affect the coupling gap between the surface 26 of conductor 22 and the surface of the valve seat 10.

To energize the inductor, there are provided a pair of closely spaced leads 30, 32 which may extend downwardly to the conductor 22 in accordance with normal practice or they may extend inwardly to a central tube 34 and a sleeve 36, respectively. In accordance with the present invention, the spacing $x$ between the leads at the conductor 22 is less than 0.050 inches and preferably in the neighborhood of 0.020 inches. The leads 30, 32 are positioned adjacent the bridge 14 between the exhaust port and intake port which is the area of lowest mass around the valve seat 10. By positioning the leads at this position, there is a reduction in the heating effect which is desirable at this particular position where the mass sink for heat is the lowest.

A primary power source 40 is connected by leads 42, 44 onto the leads 32, 30, respectively. In accordance with the invention, the primary power source is an oscillator having an output frequency between the range of 250–500 kilocycles and a power of about 10–12 kilowatts. In practice, it is preferred to use an oscillator having an output frequency of about 290 kilocycles. This provides a radio frequency which will create a relatively low reference depth in the heating pattern caused by the flux generated around conductor 22. A time delay device 46 is incorporated between leads 42, 44 so that the power source 40 is turned off after a preselected heating time. In practice, this time is in the neighborhood of 6–10 seconds. To start the heating cycle there is provided a starting device 48 which may be operated automatically after the inductor 20 is in the proper position within the exhaust port. Of course, there are several inductors 20 for heating all the exhaust ports of an engine head simultaneously. The remainder of the inductors are not shown since they are identical in structure to the illustrated inductor.

Figure 5:
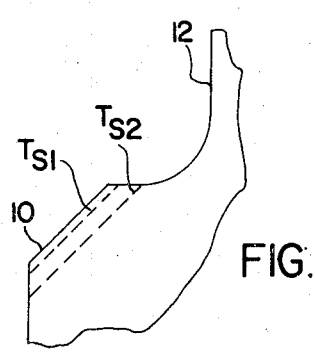
FIG. 5 is a partial view showing one operating characteristic of the present invention.

In operation, after the inductor is in position, the starting device 48 is actuated to energize the inductor 20 by the radio frequency power source 40. After a preselected time, the time delay device 46 de-energizes the inductor 20 and initiates cycling devices for removing the inductors from the exhaust ports for transportation of the engine block from the heating station. By using radio frequency in the neighborhood of 290 Kc, the relatively shallow depth is heated in the valve seat 10. This is represented by $T_{s1}$ in FIG. 5. If a low frequency were used, i.e. in the range of 10–100 Kc, the reference depth would be substantially greater and the heating pattern would extend into a lower area represented by $T_{s2}$ in FIG. 5. By providing a shallow heating depth, the metal of the valve seat 10 can be brought to temperature relatively rapidly and held to this temperature for a substantial period of time which allows the sluggish gray cast iron to transform into a hardenable metallurgical structure. After this, the austenite which is formed is hardened by the quenching action created by the mass of the engine block surrounding the valve seat.

Figure 6:
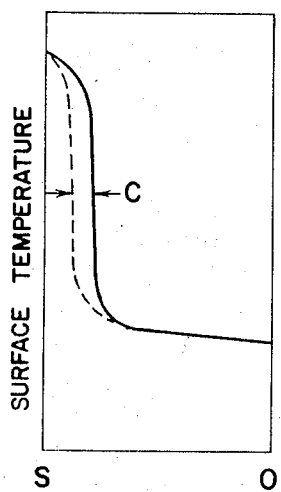
FIG. 6 is a graph illustrating, somewhat schematically, one aspect of the present invention; and, FIG. 7 is a graph similar to FIG. 6 illustrating the prior art to which the present invention is directed.

With a relatively thin heated layer at the surface of the valve seat, there is rapid quenching from the inside out. This creates the normal increase in volume due to the transformation of the austenite into martensite. Consequently, during quenching from the inside to the outside surface the surface of the valve seat remains in compression. This concept is shown in FIG. 6 wherein the solid line represents the heating profile from the surface S to the interior of the valve seat O immediately after heating. During cooling, the profile progresses outwardly as shown by the dashed line and the depth C is hardened prior to hardening of the surface. This causes compression within the surface of the valve seat.

Figure 7:
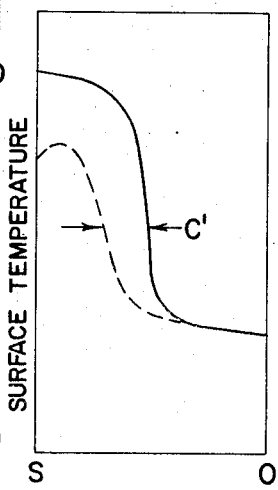

If a relatively large depth is heated by a lower frequency, the prior art shown in FIG. 7 occurs. In this arrangement, as the valve seat is hardening, the profile shown in dashed lines is cooled to a depth C'. However, at the same time the surface temperature of the valve seat is decreasing by radiation. This causes a possible tension within the surface of the valve seat. As is known, when tension is created in the valve seat surface, there is a greater tendency for cracking. Also, by providing a relatively thin heating pattern, the mass surrounding the valve seat has a lesser effect on the cooling operation.

In some instances, it is desirable to bring the valve seat to temperature at a more rapid rate. This is accomplished by providing a secondary power source 50 having a higher power rating and a 290 kilocycle frequency. The starting device 48 first energizes the secondary power supply which causes a high power density to flow through the conductor 22. This raises the temperature of the valve seat 10 at a rapid rate to a temperature approaching the desired temperature. After a short time, in the neighborhood of 4–6 seconds, the time delay device 52 then de-energizes the secondary power source 50 and energizes the normal power source 40. This power source then raises the temperature of the valve seat more slowly to the actual desired temperature. In this manner, the material adjacent the valve seat is at a high level for a longer period of time. In addition, the heating cycle is less critical and there is a reduction in the possibility of overheating the surface of the valve seat which could cause grain coarsening and possible melting. This two step operation is a second embodiment of the present invention and provides the advantages discussed in connection with the first embodiment.

In accordance with the present invention, the inductor 20 is provided with modifications that substantially enhance the uniformity of the heating pattern for better utilization of the concept mentioned above. The conductor 22 is mounted within an insulated support 60 having a lower guide tip 62 that extends into an opening 64 within the exhaust port for locating the conductor 22 in an accurate manner with respect to the valve seat 10. Also, the tip 62 includes a flange 66 which coacts with the machined shoulder 68 adjacent the opening 64. In this manner, conductor 22 is accurately positioned in vertical and radial directions. To further improve the uniformity, the conductor 22, although circular in nature, is slightly eccentric with a relatively large gap $c$ adjacent the low mass portion of the valve seat, as shown in FIG. 3, a relatively narrow gap $d$ adjacent the high mass areas of the valve seat shown in FIGS. 2, 2A and a relatively large gap $z$ shown in FIG. 4 adjacent the low mass area at the bridge 14. By changing the contour of the conductor, the coupling gap between the valve seat and the conductor is varied at different positions on the circumference of the valve seat. Consequently, adjacent high mass areas, a smaller gap is provided to create more heating. When the mass is relatively small in a certain area, a larger gap is created which reduces the heating effect adjacent these areas. This provides a uniformity around the circumference of the valve seat irrespective of the mass variations.

Referring now to FIGS. 2 and 2A, it is noted that there is larger mass adjacent the upper extremity of the valve seat 10. Consequently, there should be greater heating adjacent the upper extremity than adjacent the lower extremity. This is done, in accordance with the present invention, by reducing the flux adjacent the lower extremity. A variety of arrangements could be used for this purpose; however, a chamfer 70 is removed from the surface 26 of the conductor 22. This chamfer is created by cutting away a portion of the corner to a depth $y$. Referring now to FIG. 4, wherein the decreased mass is adjacent the upper extremity of the valve seat 10, a chamfer 72 can be provided in the same manner as chamfer 70. Consequently, there is a reduced heating effect adjacent the upper extremity of the valve seat. This contouring of the heating face of conductor 22 provides a more uniform heating pattern from top to bottom of the valve seat. This concept together with the concept of varying the coupling gap around the circumference of the conductor 22 provides an extremely uniform heating pattern in the valve seat irrespective of mass variations. It is within the contemplation of the present invention to provide only the contouring of the conductor 22 or the variable spacing of the conductor 22 from the valve seat to provide uniformity; however, it is preferred to use both of these concepts.

Having thus defined our invention, we claim:

1. An induction heating device for inductively heating the first of a pair of closely positioned conical valve seats in an internal combustion engine component, said device comprising: an inductor having a generally circular shape matching said first valve seat; means for positioning said inductor adjacent said valve seat and spaced only slightly therefrom; a radio frequency power source; means including two spaced leads for connecting said power source to said inductor; means for starting said power source; means for stopping said power source after a preselected time; said inductor being of a shape such that at least a first portion of said inductor is spaced radially from said seat more than a second portion of said inductor; and, means for locating said inductor with said first portion adjacent a first area of said valve seat and with said second portion adjacent a second area of said valve seat with said first area having a letter mass than said second area.

2. An induction heating device for inductively heating the first of a pair of closely positioned conical valve seats in an internal combustion engine component, said device comprising: an inductor having a generally circular shape matching said first valve seat; means for positioning said inductor adjacent said valve seat and spaced only slightly therefrom; a radio frequency power source; means including two spaced leads for connecting said power source to said inductor; means for starting said power source; means for stopping said power source after a preselected time; said inductor including a generally rectangular cross-sectioned conductor; and, means for mounting said conductor with one surface thereof being generally parallel to said one conical valve seat; said one conical valve seat having a first and second vertical extremity with said first extremity having less adjacent mass than said second extremity; and, means for reducing the flux of said conductor at said first extremity.

3. An induction heating device as defined in claim 2 wherein said reducing means includes a reduced portion of said conductor adjacent said first extremity.

* * * * *